Dec. 18, 1934.          G. E. NERNEY          1,984,541
                      EYEGLASS CONSTRUCTION
                       Filed Feb. 13, 1933
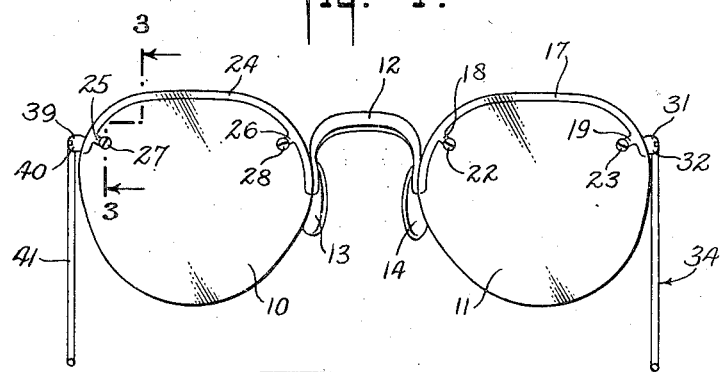
INVENTOR
George E. Nerney
BY
ATTORNEYS Patented Dec. 18, 1934

1,984,541

UNITED STATES PATENT OFFICE 1,984,541

EYEGLASS CONSTRUCTION

George E. Nerney, Attleboro, Mass., assignor to Bay State Optical Company, Attleboro, Mass., a corporation of Maine Application February 13, 1933, Serial No. 656,412

14 Claims. (Cl. 88—47)

This invention relates to an eyeglass construction.

One of the objects of this invention is to provide a simple, durable and thoroughly practical eyeglass construction. Another object is to provide a construction of the above character which will be attractive in appearance without sacrificing ruggedness of construction. Another object is to provide a construction of the above character which may be economically manufactured and assembled with ease and with a minimum amount of labor. Another object is to provide a construction of the above character which, while giving the general appearance of a rimless frame, nevertheless retains many of the durable characteristics of a rim frame or the like. Another object is to provide a construction of the above character which may be quickly assembled and which may be easily adapted to compensate for any inaccuracies, as, for example, the positioning of the holes in the lenses. Other objects will be in part obvious and in part pointed out hereinafter.

The invention accordingly consists in the features of construction, combinations of elements and arrangements of parts as will be exemplified in the structure to be hereinafter described, and the scope of the application of which will be indicated in the following claims.

In the accompanying drawing, in which is shown one of the various possible embodiments of my invention, Figure 1 is a front elevation of an eyeglass frame having the features of my invention embodied therein;

Figure 2 is a rear elevation of the frame shown in Figure 1, certain of the parts thereof being broken away;

Figure 3 is a sectional view of certain of the parts of my invention taken along the line 3—3 of Figure 1;

Figure 4 is a fragmentary top plan view of the endpiece construction, certain of the parts thereof being broken away, and Figure 5 is a front elevation of an eyeglass frame showing certain other features of my invention.

Similar reference characters refer to similar parts throughout the several views of the drawing.

In order that certain features of my invention may be more clearly understood, it might here be pointed out that many difficulties have confronted the manufacturer and assembler of eyeglass frames commonly known as "rimless frames". In this particular type of frame it is usually desirable to support each lens from two points generally in the vicinity of the bridge and endpiece respectively. Due to the delicate nature of the connection between the lens, the bridge and the endpiece, it has been found in practice that after the usual use, these connections often become loose and insecure. Oftentimes the result of such loose connections is the production of "lens sag", an undesirable condition wherein the lenses sag downwardly from the bridge in the general direction of the mouth of the wearer. Not only is such a condition bothersome to the wearer, but, also, it is conducive to frequent lens breakage and other disorders. Further, in securing the endpiece and bridge parts to the lenses, any inaccuracies in the positioning of the holes makes for a weak connection and it is extremely difficult to position these holes with a fine degree of accuracy.

Accordingly it appears that although a rimless frame has many desirable qualities especially from the aspect of appearance, nevertheless it does have many structural weaknesses and does present many perplexing problems to the expert assembler. One of the various objects of this invention is to provide a construction wherein the above mentioned difficulties as well as many others are successfully and efficiently overcome.

Turning now to Figure 1, there is shown an eyeglass frame comprising a pair of lenses 10 and 11 and a bridge 12 of any suitable construction. Preferably a pair of nose guards 13 and 14 are secured to the depending end portions of bridge 12 by way of ball and socket joints or the like.

For purposes of clarity, that surface of lenses 10 and 11 adjacent the eyes of the wearer will be termed herein the "inner surface" while the opposite surface of the lenses will be referred to as the "outer surface".

A rim part 17 is suitably connected to one side of bridge 12 (Figure 1) and extends along the inner surface of lens 11 (Figure 2) so that its top edge is in substantial alinement with the top edge of the lens. Preferably rim part 17 terminates at a point spaced from the transverse axis of lens 11. Projecting radially from rim part 17 and preferably integral therewith are a pair of lugs 18 and 19 engaging the inner surface of lens 11 and extending radially substantially toward the center of the lens, as more clearly shown in Figure 2.

Suitable holes are formed in lens 11 in substantial alinement with threaded holes 20 and 21 in lugs 19 and 18 respectively. Preferably the axes of these holes in lens 11 are in substantial alinement and are spaced above the transverse axis of the lens. Turning back to Figure 1, suitable screws 22 and 23 extend through the holes in lens 11 and are threaded into holes 21 and 20 respectively to support lens 11 upon rim part 17 as will be more clearly described hereinafter.

Secured to the opposite side of bridge 12, in any suitable manner, is a rim part 24 substantially similar in construction and position to rim part 17. Thus rim part 24 extends along the inner surface of lens 10 and has its top edge in substantial alinement with the top edge of the lens. Extending inwardly from rim part 24 and preferably integral therewith is a pair of lugs 25 and 26 similar to lugs 18 and 19 (Figure 2), and screws 27 and 28 (Figure 1) extend through suitable holes in lens 10 and are threaded into lugs 25 and 26 respectively. Accordingly lens 10 is supported on rim part 24 in a manner similar to that described above with respect to rim part 17 and lens 11.

Referring now to Figure 3 which shows an enlarged view of screw 27 and lug 25, which may be taken as exemplary of the construction of lugs 18, 19 and 26 as well as their associated parts, there is preferably provided a spring washer 29 interposed between the heads of the screens and the outer surface of the lens. Spring washer 29, which may be formed from a metallic or non-metallic substance as desired, acts in a cushioning capacity between the lenses and the heads of the screws and also tends to lock the screws in their tightened positions. Further, the edge portions of lenses 10 and 11 are preferably beveled as shown most clearly in Figures 3 and 4 at 30. Thus this beveled part of the lens preferably extends from the outer surface thereof toward the inner surface and in substantial alinement with rim parts 17 and 24. The beveled edge portions of the lenses may extend about the entire periphery thereof or may cover that portion of the lens adjacent rim parts 17 and 24. Hence this beveled portion of the lenses serves to obscure and practically hide from view the rim parts 17 and 24 so that the frame as completely assembled in Figure 1 and when worn gives the appearance of a rimless frame.

A pair of spaced lugs 31 and 32 are connected to rim part 17 and extend inwardly therefrom to form an endpiece. As more clearly shown in Figure 5, the flattened portion 33 of a temple generally indicated at 34 fits between lugs 31 and 32, and a hole 35 therein is in substantial alinement with suitable holes in lugs 31 and 32 so that a securing element 36 of any suitable nature may extend therethrough. Portion 33 has an abutting wall 37 formed on one side thereof and adapted to engage a stop 38 interposed between lugs 31 and 32 when temple 34 is in its open or right angle position as shown in Figure 5. Furthermore the axis of body portion 34a of temple 34 is spaced from the center of hole 35 or, in other words, body portion 34a extends tangentially from portion 33. In this manner all portions of surface 34b of temple 34 are in substantially the same plane and the connection between the body portion 34a and the flat portion 33 of the temple is greatly strengthened.

Similarly, rim part 24 is provided with a pair of spaced lugs 39 and 40 forming an endpiece for a temple 41 substantially similar in construction to temple 34 and connected to lugs 39 and 40 in a manner similar to that described above.

It will now be seen that I have provided an eyeglass frame having many practical and advantageous features. For example, the lenses 10 and 11 are reliably supported from rim parts 17 and 24, and, due to the suitable connection existing between the endpieces and bridge 12, the above-mentioned difficulty of "lens sag" is successfully overcome. Furthermore, the simplicity of construction of this frame is obvious for certain of the parts found on the usual frame of common construction are done away with but not by sacrificing the ultimate durability of the frame.

It should be particularly noted that the assembly of this frame may be accomplished with great ease. After the holes have been drilled in lenses 10 and 11 and the rim parts 17 and 24 are to be fitted thereon, if it is found that the holes are slightly out of alinement with the holes in lugs 18, 19, 25 and 26, rim parts 17 and 24 may be bent slightly to achieve the proper alinement. This simple form of adjustment is of great convenience to the assembler and the slight bending necessary to accomplish it does not detract from the appearance of the frame after assembly nor from its practicability in use. Accordingly the assembler is not compelled to use the usual extreme care in the positioning of the holes in the lenses, and, if an inaccuracy does develop, he does not ruin a lens as may be the case in the assembly of the ordinary rimless frame. Furthermore it should be noted that the achievement of the additional durability following from the use of rim parts 17 and 24 does not detract from the appearance of the frame for these parts are made practically inconspicuous due to their position and also in part due to the provision of the beveled edge portions on the lenses.

This construction is also conducive to a neat endpiece construction which may be positioned closer to the edge of the lenses than is the case in ordinary frames, and, also, the reforming of the temples as described above adds to their durability.

In Figure 5 there is shown another embodiment of my invention in which lenses 50 and 51 are supported by a pair of rim parts 52 and 53 similar in many respects to rim parts 17 and 24. Thus a bridge 54 is connected to rim parts 52 and 53 and a pair of nose pads 55 and 56 is connected in any suitable manner to depending portions of the bridge. Lugs 57, 58, 59 and 60 extend radially from rim parts 52 and 53 preferably over the inner surfaces of lenses 50 and 51, and suitable screws generally indicated at 61 extend through the lenses and are threaded into these lugs. Accordingly lenses 50 and 51 are adequately supported upon rim parts 52 and 53.

Portions 52a and 53a of rim parts 52 and 53 depend a substantial distance from lugs 57 and 60 and I prefer to connect temples 62 and 63 substantially at the ends thereof. Accordingly end portions 52a and 53a may be bent in any direction in order to adjust the positions of temples 62 and 63. While portions 52a and 53a are sufficiently durable to withstand conditions of practical use they may nevertheless be easily adjusted in many directions, thus making the frame more adaptable to the distinctive requirements of each individual.

It will thus be seen that I have provided a thoroughly practical and efficient construction in which the several objects herein mentioned above as well as many others are successfully and practically accomplished.

As many possible embodiments may be made of the above invention and as many changes might be made in the embodiment above set forth, it is to be understood that all matter hereinbefore set forth or shown in the accompanying drawing is to be interpreted as illustrative and not in a limiting sense.

I claim:

1. In eyeglass construction, in combination, a pair of lenses, a bridge, a pair of rim parts each connected to one side of said bridge and extending along one plane surface only of said lens, the top surface of said rim parts being in substantial alinement with the top edge of said lenses, said rim parts terminating at points spaced from the transverse axes of said lenses, said lenses having holes extending therethrough, the holes being in substantial alinement at points spaced from the transverse axes of said lenses, radially extending lugs connected to said rim parts and having threaded holes in substantial alinement with said first-mentioned holes, screws extending through said lenses and threaded into said holes, and spring washers interposed between the heads of said screws and said lenses.

2. In eyeglass construction, in combination, a pair of lenses, a bridge, a pair of rim parts each connected to one side of said bridge and extending along one plane surface only of said lens, the top surface of said rim parts being in substantial alinement with the top edge of said lenses, said rim parts terminating at points spaced from the transverse axes of said lenses, said lenses having holes extending therethrough, the holes being in substantial alinement at points spaced from the transverse axes of said lenses, radially extending lugs connected to said rim parts and having threaded holes in substantial alinement with said first-mentioned holes, screws extending through said lenses and threaded into said holes, spring washers interposed between the heads of said screws and said lenses, and a pair of endpieces each secured to one of said rim parts substantially at said points of termination.

3. In eyeglass construction, in combination, a pair of lenses, a bridge, a pair of reinforcing members extending from said bridge along the inner surface only of said lenses and substantially following the contour of the top edge of said lenses and terminating at points spaced from the transverse axes of said lenses, pairs of spaced lugs connected to said members at said last-mentioned points, radial lugs extending inwardly along the inner surface of said lenses, securing members extending from the outer surface of said lenses therethrough and into said radial lugs, and temples fitting between each of said first-mentioned pairs of lugs.

4. In eyeglass construction, in combination, a pair of lenses, a bridge, a pair of parts each connected to one side of said bridge and extending therefrom along the inner surface only of said lenses to points on said lenses spaced laterally from said bridge, radial lugs extending inwardly over the inner surface of said lenses, said lenses having a plurality of holes formed therein in substantial alinement with said lugs, and a series of securing elements extending through said holes in said lenses and connected to said lugs.

5. In eyeglass construction, in combination, a lens, a rim part engaging one plane surface only of said lens, a plurality of lugs connected to said rim part and extending along said last-mentioned surface of said lens, and securing elements extending through said lens and connected to said lugs.

6. In eyeglass construction, in combination, a lens having its edge beveled, the bevel extending from the outer surface thereof toward the rear surface thereof, a rim part extending along the inner surface of said lens substantially behind said beveled portion, a plurality of radially extending lugs connected to said rim part, and securing elements extending through said lens and connected to said lugs.

7. In eyeglass construction, in combination, a lens having its edge beveled, the bevel extending from the outer surface thereof toward the rear surface thereof, a rim part extending along the inner surface only of said lens substantially behind said beveled portion, a plurality of radially extending lugs connected to said rim part, screws extending through said lens and threaded into said lugs, and resilient members interposed between the heads of said screws and the outer surface of said lens.

8. In eyeglass construction, in combination, a lens, a rim part substantially following a portion of the periphery of said lens and engaging one plane surface only thereof, said lens having a pair of spaced holes, and securing elements extending through said holes and threaded into portions of said rim part.

9. In eyeglass construction, in combination, a pair of lenses, a bridge, a rim part connected to one side of said bridge and extending along one plane surface only of one of said lenses substantially following the contour of the top edge thereof to a point spaced from the transverse axis of said last-mentioned lens and spaced laterally from said bridge, a rim part connected to the other side of said bridge and extending along one plane surface only of said other lens substantially following the contour of the edge of said last-mentioned lens to a point spaced from the transverse axis of said last-mentioned lens and laterally spaced from said bridge, radially extending lugs connected to each of said rim parts at spaced points, said lenses having a series of holes all spaced above the transverse axes of said lenses and in substantial alinement with said lugs, and screws extending through said holes and threaded into said lugs.

10. In eyeglass construction, in combination, a pair of lenses having beveled edge portions, a bridge, a rim part connected to one side of said bridge and extending along one plane surface only of one of said lenses substantially following the contour of the top edge thereof to a point spaced from the transverse axis of said last-mentioned lens and spaced laterally from said bridge, a rim part connected to the other side of said bridge and extending along one plane surface only of said other lens substantially following the contour of the edge of said last-mentioned lens to a point spaced from the transverse axis of said last-mentioned lens and laterally spaced from said bridge, both of said rim parts being positioned substantially behind said beveled edge portions, radially extending lugs connected to each of said rim parts at spaced points, said lenses having a series of holes all spaced above the transverse axes of said lenses and in subtantial alinement with said lugs, and screws extending through said holes and threaded into said lugs.

11. In eyeglass construction, in combination, a pair of lenses, a bridge, a pair of rim parts each connected to one side of said bridge and each extending along the inner surface only of one of said lenses to points laterally spaced from said bridge on said lenses, and means connecting said rim parts to said lenses at spaced points whereby said rim parts support said lenses from said bridge.

12. In eyeglass construction, in combination, a pair of lenses having beveled edge portions, a bridge, a pair of rim parts each connected to one side of said bridge and each extending along the inner surface only of one of said lenses to points laterally spaced from said bridge on said lenses, the rim parts being positioned substantially behind said beveled edge portions, and means connecting said rim parts to said lenses at spaced points whereby said rim parts support said lenses from said bridge.

13. In eyeglass construction, in combination, a lens, a rim part substantially following a portion of the periphery thereof and engaging one plane surface only thereof, a pair of lugs secured to said rim part and extending radially substantially toward the center line of said lens, means for securing said lugs to said lens, an endpiece including an abutting wall, and a temple comprising a body portion and a flattened portion at one end thereof, said flattened portion having a hole extending therethrough the axis of which is substantially at right angles to the axis of said body portion and having a wall adapted to abut against said abutting wall on said endpiece, the supporting section of said flattened portion being located between said body portion and said wall and having a larger radius than the remainder of said flattened portion, and said body portion being located wholly behind said supporting section so that the axis thereof is spaced from said hole whereby said supporting section and said body portion coact to reenforce said wall against bending.

14. In eyeglass construction, in combination, a pair of lenses, a bridge, a pair of parts connecting said bridge to said lenses, a pair of rim members connected to said parts and extending along one plane surface only of said lenses to points thereon substantially spaced from said parts, and a plurality of securing elements extending through each of said lenses and connected to said parts, said securing elements being substantially spaced from one another.

GEORGE E. NERNEY.